United States Patent [19]
Crystal

[11] 3,974,078
[45] Aug. 10, 1976

[54] ELECTROSTATE GRAPHIC DEVELOPMENT OF ENCAPSULATED MATERIALS

[75] Inventor: Richard G. Crystal, Penfield, N.Y.

[73] Assignee: Xerox Corporation, Stamford, Conn.

[22] Filed: Dec. 30, 1971

[21] Appl. No.: 214,481

[52] U.S. Cl. .......................... 252/62.1 P; 96/1.5 D; 427/14
[51] Int. Cl.² .......................................... G03G 9/00
[58] Field of Search .......... 252/62.1, 316; 264/122; 96/97, 98; 117/100 C, 100 R, 17.5

[56] References Cited
UNITED STATES PATENTS

| | | | |
|---|---|---|---|
| 2,989,782 | 6/1961 | Barkhuff et al. | 117/100 C |
| 3,043,782 | 7/1962 | Jensen | 252/316 |
| 3,080,250 | 3/1963 | Claus | 252/62.1 |
| 3,083,118 | 3/1963 | Bridgeford | 96/115 P |
| 3,143,508 | 8/1964 | Kaprelian | 252/62.1 |
| 3,405,070 | 10/1968 | Reyes | 252/316 |
| 3,502,582 | 3/1970 | Clemens et al. | 252/62.1 |
| 3,629,140 | 12/1971 | Bayless | 252/316 |
| 3,657,144 | 4/1972 | Yoshida | 252/316 |

*Primary Examiner*—Jack P. Brammer
*Attorney, Agent, or Firm*—J. J. Ralabate; D. C. Kolasch; A. W. Karambelas

[57] ABSTRACT

A toner in which at least a major portion of the resin component is a soft polymer encapsulated and dispersed in a tough polymer matrix in a plurality of discrete domains, instead of as a single core. A convenient method of providing such dispersion is by the use of a block, graft or shaded copolymer, as a dispersing agent, comprised of components which are identical to the soft and tough polymers. The toner is pressure fixable.

11 Claims, No Drawings

ELECTROSTATE GRAPHIC DEVELOPMENT OF ENCAPSULATED MATERIALS

This invention relates to electrostatography, and more particularly to improved electrostatographic developing materials and the use thereof.

Electrostatography is best exemplified by electrophotography. The basic electrophotographic process, as taught by C. F. Carlson in U.S. Pat. No. 2,297,691, involves placing a uniform electrostatic charge on a photoconductive insulating layer, exposing the layer to a light-and-shadow image to dissipate the charge on the areas of the layer exposed to the light and developing the resulting latent electrostatic image by depositing on the image a finely divided electroscopic material referred to in the art as "toner". The toner will normally be attracted to those areas of the layer which retain a charge, thereby forming a toner image corresponding to the latent electrostatic image. This powder image may then be transferred to a support surface such as paper. The transferred image may subsequently be permanently affixed to the support surface as by heat. Instead of latent image formation by uniformly charging the photoconductive layer and then exposing the layer to a light-and-shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing steps.

The toners employed in the art are generally fixed to a support medium by the application of heat and, therefore, such toners must be heated to a temperature at which the toner flows in order to effect fusing of the toner to the support medium. The fusion technique, although highly successful, has some disadvantages; namely, such a technique has not been readily adaptable to high speed machines as a result of the time or energy required to raise the temperature of the toner to a temperature at which the toner can be fused to the support medium. Attempts to rapidly fuse a high melting point toner by means of oversized high capacity heating units result in excessive energy requirements as well as the problems associated with preventing the charring of paper receiving sheets and of adequately dissipating the heat evolved from the fusing unit or units. Thus, in order to avoid charring or combustion, additional equipment such as complex and expensive cooling units are necessary to properly dispose of the large quantity of heat generated by the fuser. Incomplete heat removal can cause damage to heat sensitive machine components. Further, the increased space occupied by and the high operating cost of the heating and cooling units, often outweigh the advantages achieved by the increased machine speed. On the other hand, low molecular weight resins which are easily heat fused at relatively low temperatures are often undesirable because these materials tend to form thick films on reusable photoconductor surfaces. These films tend to cause image degradation and contribute to machine maintenance down time. In addition, low molecular weight resins tend to form tacky images on the copy sheet which often offsets to other adjacent sheets. Further, toner particles containing low molecular weight resins tend to bridge, cake and block in the shipping container as well as in the electrostatographic machine. Furthermore, many of such polymers do not possess the toughness required to resist the mechanical attrition which tends to break down the toner particles into undesirable dust fines.

An object of this invention is to provide an improved electrostatographic developer.

Another object of this invention is to provide a toner which overcomes the above-mentioned deficiencies.

A further object of this invention is to provide a toner which is capable of being rapidly and facilely fixed to a support surface.

These and other objects of the invention should be apparent from reading the following detailed description thereof.

The objects of the present invention are broadly accomplished by providing an electrostatographic toner of the colored resinous material in which at least a major portion of the resinous material is a heterogeneous (two phase) physical mixture comprised of at least one soft deformable polymer dispersed and encapsulated in a matrix of at least one tough polymer, as a plurality of discrete domains, instead of as a single core.

More particularly, the resinous portion of the toner includes two incompatible polymers one of which is employed as a matrix and the other of which is dispersed in a plurality of discrete domains and encapsulated in the matrix. The matrix component is a tough material to provide the physical properties which prevents blocking of and provides structural rigidity to the toner, and the dispersed component, is a soft material which provides the desired fixing properties. In the use of such a two phase resin system, it has been found that the softer material must be completely encapsulated within the tough matrix material, and in addition, it has been found that the manner in which the softer component(s) is dispersed within the matrix influences the properties of the toner. The dispersion of the encapsulated softer component(s) as a plurality of domains of controlled size, results in an improved toner; in particular, a toner which is capable of being fixed by the application of pressure.

In general, the tough polymer which is employed as a matrix has a glass transition temperature (Tg) of greater than about 50°C., preferably from about 55° to about 180°C., and more preferably from about 60° to about 90°C. If the polymer is crystalline, then the melting temperature (Tm) is greater than about 40°C., preferably from about 50° to about 90°C and more preferably from about 60° to about 70°C. Thus, if the tough polymer is crystalline, the Tm must be greater than about 40°C. The molecular weight (number average) of the tough polymer block is greater than 1500, generally from about 5,000 to about 300,000, and preferably from about 10,000 to about 100,000.

The molecular weight and Tg of the tough polymer matrix is selected to provide a matrix which is sufficiently tough to withstand the forces involved in the development and which can also be deformed during the fixing step. If the tough polymer includes polar groups, the molecular weight can be lower than those polymers which do not include polar groups while still providing the requisite toughness. The properties which are conveniently utilized in characterizing the tough polymer are the properties of tensile strength, impact strength and modulus of elasticity. In general, the tough polymer has a tensile strength of at least about 3,000 psi, and more generally greater than about 5,000 psi, with the tensile strength generally not exceeding about 10,000 psi. It is to be understood, however, that polymers with tensile strengths in excess of about 10,000 psi could also be suitable for the purposes of the present invention. The tough polymer is also generally characterized by an izod impact strength (ASTM Test Method D-256) of greater than 0.25, more generally from about 0.25 to about 15, with most of the tough polymers which are utilized in accordance with the invention having an izod impact strength of from about 0.25 to about 1.5. The tough polymer is also generally characterized by a modulus of elasticity (Tensile Modulus) of greater than 200,000 psi, and more generally greater than 400,000 psi. The tough polymer used in accordance with the teachings of the present invention generally do not have a modulus of elasticity in excess of 600,000 psi, but it is to be understood that tough polymers having a modulus of elasticity greater than 600,000 psi are within the scope of the invention.

The tough polymer may be a homopolymer or a copolymer and as representative examples of such polymers (the term polymer as used herein includes homopolymers and copolymer, with the term copolymer referring to polymers formed from two or more monomeric components), there may be mentioned: styrene polymers such as polystyrene, poly (halostyrene), poly (alkyl styrenes), styrene-n-butyl methacrylate copolymer; polymers of alkylmethacrylates wherein the alkyl group has from 1–3 carbon atoms; polymers of acrylonitrile; polymers of vinyl halides, such as vinyl chloride polymers; polyamides; polyesters; polymers of acrylic acid; polymers of methacrylic acid; polymers of vinyl N-alkyl pyridine; polycarbonates and the like.

In general, the soft polymer, which can be amorphous or crystalline, has a glass transition temperature (Tg) of less than about 30°C., preferably from about −50° to about 10°C, and more preferably from about −50° to about 0°C. The molecular weight (number average) of the soft polymer is generally from about 500 to about 50,000, and preferably from about 1,000 to about 20,000. It is to be understood that within the specified ranges, soft polymers with lower glass transition temperatures may have higher molecular weights and still impart the desired fixing properties.

The molecular weight and glass transition temperature of the soft polymer are selected to provide a soft polymer core which is sufficiently soft to deform upon the application of shear stress. In general, the soft polymers which are suitable for the purposes of the present invention are characterized by their yield stress, with the yield stress of the soft polymer generally being from about 20 to about 20,000 psi, and preferably from about 50 to about 3,000 psi.

The soft polymer may be a homopolymer or a copolymer including random, block and alternating copolymers and as representative examples of such polymers (the term polymer as used herein includes homopolymers and copolymers with the term copolymer referring to polymers formed of two or more monomeric components), there may be mentioned: polymers of alkylene oxides, such as polymers of ethylene oxide; polymers of lactones, such as polycaprolactone; siloxane polymers, such as poly (dimethylsiloxane); polymers of alkyl acrylates wherein the alkyl group has from 1–12 carbon atoms; polymers of alkyl methacrylates wherein the alkyl group has from 4–12 carbon atoms; urethane polymers; uncrosslinked diene polymers; polyolefin waxes; polymers of vinylidene chloride; polyesters such as the polyalkylene adipates, polyalkylene sebecates, vinyl acetate polymers, and the like.

The domain size of the soft polymer component, encapsulated within the matrix, has been found to influence both the fixing properties and the impaction properties of the toner, with an increase in the domain size enhancing the pressure fixability of the toner and derogating from the impaction properties thereof. In general, the average domain size of the soft polymer component dispersed in the matrix is less than 15 microns; more generally from about 0.002 micron to about 8 microns, and preferably from about 0.1 micron to about 2 microns. The domain size of the soft component encapsulated within the matrix may be determined by any of a wide variety of procedures known in the art; e.g., transmission electron microscopy of ultra thin microtomed sections; light scattering techniques; etc.

The soft polymer component and the tough polymer component are incompatible with each other; i.e., the soft and tough polymer components are not completely soluble in each other and form two distinct phases, and may be employed over a wide range of proportions, provided that the tough polymer component is present in an amount sufficient to provide a protective matrix which essentially completely surrounds the dispersed soft polymer component. In general, the matrix component should be present in an amount from about 10% to about 90%, by weight, and preferably from about 50% to about 80%, by weight, based on the two components.

The soft polymer component may be dispersed in the tough polymer matrix in a plurality of discrete domains by partially compatibilizing the soft polymer component with the tough polymer component. This may be easily accomplished by the use of a dispersing agent which is either a block copolymer comprised of one block compatible with the dispersed component and a second block compatible with the matrix component and/or a graft copolymer comprised of a polymer backbone compatible with one of the dispersed or matrix components and a polymer side chain compatible with the other of said dispersed or matrix components and-/or a shaded copolymer formed of one component which is compatible with the matrix component and a second component which is compatible with the dispersed component (a shaded copolymer, as known in the art, is a random copolymer in which one end of the chain has a high concentration of one component of the copolymer and the other end of the chain has a high concentration of a second component of the copolymer. As a result of such a structure a shaded copolymer functions as a dispersing agent for the purpose of the present invention). In general, such compatibility is best achieved by having one component of the block and/or graft and/or shaded copolymer identical to the dispersed soft component and a second component thereof identical to the tough matrix component. Thus, for example, if the matrix component is polystyrene and the soft component is polyethylene oxide, the dispersing agent would include polymeric components of ethylene oxide and styrene.

The amount of dispersing agent employed in the toner affects the domain size of the dispersed soft component, with an increase in the amount of the dispersing agent decreasing the domain size, as a result of providing an increase in the amount of interface sites.

The amount of dispersing agent is controlled to provide domain sizes in the order of those hereinabove specified. In general, the amount of dispersing agent employed is from about 1% to about 50%, and preferably from about 5% to about 20%, by weight, of the three components. In addition, the molecular weight of each of the components of the dispersing agent preferably corresponds to or is less than the molecular weight of the corresponding tough and/or soft polymer component of the toner.

The block and/or graft and/or shaded copolymer used as a dispersing agent may include polymeric components in addition to those present as the dispersed and matrix phases of the toner, and preferably the block and/or graft copolymer is comprised of only those polymeric components present in the toner. If one of the components of the toner is a copolymer, then one of the blocks and/or components of the graft is preferably also a copolymer, but in general, the toner components are homopolymers and, therefore, the block and/or graft copolymer is also comprised of homopolymeric units.

The block copolymers and graft copolymers and shaded copolymers used as dispersing agents are known in the art and may be prepared by any one of a wide variety of well-known procedures. The manner of producing such block and/or graft copolymers and/or shaded copolymers does not form any part of the present invention and, accordingly, no further description is deemed necessary for a full understanding of the present invention.

Another manner of partially compatabilizing the dispersed soft polymer with the tough polymer matrix to provide a plurality of discrete domains, instead of a single core, of the soft polymer dispersed in the tough polymer matrix is by using a block and/or graph copolymer as one or both of the dispersed and matrix components. Thus, for example, the dispersed soft polymer component may be comprised of a block or graft copolymer, one component of which is a soft polymer, as hereinabove described, and the other component of which is compatible with the tough polymer matrix, with the aforementioned other component functioning as a dispersing agent for dispersing the soft polymer component as a plurality of discrete domains in the tough polymer matrix. Similarly, the tough polymer matrix may be comprised of a block or graft copolymer, one component of which is a tough polymer, as hereinabove described, and the other component of which is compatible with the dispersed soft polymer, with the aforementioned other component functioning as a dispersing agent for dispersing the soft polymer component as a plurality of discrete domains in the tough polymer matrix. Thus, for example, a block copolymer of styrene and butadiene may be used as the soft polymer component and a polystyrene used as the matrix component, with the styrene component of the block copolymer functioning as a dispersing agent to disperse the butadiene component of the block copolymer as a plurality of domains in the polystyrene matrix.

The resin mixture comprised of a soft polymer component encapsulated in a tough polymer component may be prepared by spray drying of the polymer components from a solvent comprised of a mutual solvent for all components, and a preferential solvent for the matrix component, which has a boiling point greater than the mutual solvent. The spray drying results in an initial removal of the mutual solvent which precipitates the soft polymer component to form a matrix about the soft polymer component. Alternatively, a mutual solvent for all components in which the dispersed component is less soluble than the matrix component may also be employed for producing the encapsulated toner.

Specific techniques for producing encapsulated toner in accordance with the present invention are also described in U.S. application Ser. No. 214,374 now U.S. Pat. No. 3,784,052 and U.S. application Ser. No. 214,031 now U.S. Pat. No. 3,830,750, both filed concurrently herewith, and the teachings of such applications in this respect are hereby incorporated by reference.

Another technique for producing toners in accordance with the present invention is coascervation. Coascervation generally involves dissolving both the dispersed and matrix component in a mutual solvent followed by the addition of a non-solvent in a manner to precipitate both components from the solution, with the dispersed component being precipitated prior to the matrix component. Coascervation is known in the art and, accordingly, no further details are deemed necessary for an understanding of the application of this technique for producing the encapsulated toners of the present invention.

The toner of the present invention includes a colorant, either a pigment or dye, in a quantity sufficient to impart color to the resin composition, generally in a quantity up to about 25%, by weight, and particularly from about 1% to about 20%, by weight of the toner, whereby the resulting toner will form a clear visible image on a transfer member. Any one of a wide variety of pigments or dyes which do not adversely affect the properties of the toner may be employed to impart color to the resin; e.g., carbon black, a commercial red, blue or yellow dye, and since such dyes and/or pigments are well known in the art, no detailed enumeration thereof is deemed necessary for a full understanding of the invention. The toners of the present invention generally have an average particle size of less than 30 microns and preferably from about 10 to about 20 microns.

The hereinabove described toner of the invention may also include other materials generally employed for modifying the characteristics of a toner, such as conductive materials to modify the triboelectric properties thereof or the like, and the use of such materials is deemed to be within the scope of those skilled in the art from the teachings herein. Similarly, the toner may include a resinous component other than the hereinabove described resin mixture, provided that at least a major portion of the resinous portion of the toner is comprised of the hereinabove described encapsulated resin mixture; generally, the encapsulated resin mixture comprises from about 80% to about 100%, preferably from 90% to 100%, of the resinous portion of the toner. The remaining portion of the resinous component of the toner, if any, is generally a resin of the type employed to modify the physical properties of a toner material.

The toner hereinabove described, is employed in a developer composition by loosely coating the toner on a suitable electrostatographic developer carrier surface to which the toner is affixed by electrostatic attraction, as generally known in the art. Thus, for example, the toner composition may be employed in the cascade development technique, as more fully described in U.S. Pat. No. 2,618,551 to Walkup, U.S. Pat. No. 2,618,552 to Wise, and U.S. Pat. No. 2,638,416 to Walkup et al. In the cascade development technique, the developer composition is produced by mixing toner composition with a carrier, either electrically conducting or insulating, magnetic or non-magnetic, provided that the carrier material when brought in close contact with the toner composition acquires a charge having an opposite polarity to that of the toner whereby the toner adheres to and surrounds the carrier. Thus, the carrier material is selected in accordance with its triboelectric properties so that the toner is either above or below the carrier material in the triboelectric series, to provide a positively or negatively charged toner.

The carrier particles are larger than the toner particles by at least one order of magnitude of size and are shaped to roll across the latent image-bearing surface. In general, the carrier particles should be of sufficient size so that their gravitational or momentum force is greater than the force of attraction of the toner particles in the area of the image-bearing surface where the toner particles are retained, whereby the carrier will not be retained by the toner particles which are attracted to the image-bearing surface. The carrier particles generally have a particle size from about 30 to about 1000 microns, but it is to be understood, that the carrier particles may be of a size other than as particularly described, provided that the carrier flows easily over the image-bearing surface, without requiring special means for effecting removal of the carrier particles from the image-bearing surface.

The degree of contrast or other photographic qualities in the finished image may be varied by changing the relative proportions of toner and carrier material and the choice of optimum proportions is deemed to be within the scope of those skilled in the art. In general, however, the toner of the invention is employed in amounts to provide weight ratios of carrier to toner of from about 25:1 to about 250:1, preferably from about 75:1 to about 100:1, to produce a dense readily transferable image.

In addition to the use of particles to provide the carrier surface, the bristles of a fur brush may also be used. Here also, the toner particles acquire an electrostatic charge of polarity determined by the relative position of the toner particles and the fur fibers in the triboelectric series. The toner particles form a coating on the bristles of the fur clinging thereto by reason of the electrostatic attraction between the toner and the fur just as the toner clings to the surface of the carrier particles. The general process of fur brush development is described in greater detail in U.S. Pat. No. 3,251,706 to L. E. Walkup.

Even more closely related to the cascade carrier development is magnetic brush development. In this process, a carrier is selected having ferromagnetic properties and selected relative to the toner in a triboelectric series so as to impart the desired electrostatic polarity to the toner and carrier as in cascade carrier development. On inserting a magnet into such a mixture of toner and magnetic material the carrier particles align themselves along the lines of force of the magnet to assume a brush-like array. The toner particles are electrostatically coated on the surface of the powder carrier particles. Development proceeds as in regular cascade carrier development on moving the magnet over the surface bearing the electrostatic image so that the "bristles" of the magnetic brush contact the electostatic image-bearing surface.

Still another method of carrier development is known as sheet carrier development in which the toner particles are placed on a sheet as of paper, plastic, or metal. This process is described in U.S. Pat. No. 2,895,847 to C. R. Mayo. As described therein the electrostatic attraction between the sheet surface and toner particles necessary to assure electrostatic attraction therebetween may be obtained by leading the sheet through a mass of electroscopic toner particles whereby there is obtained a rubbing or sliding contact between the sheet and the toner. In general, it is desirable to spray the surface of the sheet bearing the electroscopic toner particles with ions of the desired polarity as by the use of a corona charging device as described in the patent of Mayo.

The resulting image of toner particles of the image-bearing surface may then be transferred to a suitable transfer member to form the final copy. The transfer of the toner particles may be effected adhesively or electrostatically as known in the art.

The toner as should be apparent from the hereinabove teachings, may be employed in a wide variety of developer compositions by electrostatically coating the toner composition to a suitable carrier surface, which is subsequently passed over a latent image-bearing surface. The toner of the invention may also be employed for developing an electrostatic latent image formed by other than electrophotographic means; for example, the development of electrostatic latent images formed by pulsing electrodes as employed in electrostatic printing processes. In addition, the toner of the invention may be employed for developing an electrostatic latent image on a surface other than a photoconductive insulating surface. Therefore, the overall invention is not limited to a specific technique for forming or developing an electrostatic latent image or to a specific carrier for the toner.

The toners of the present invention are capable of being fixed to a suitable support medium such as paper to provide a finished copy by the application of pressure; with the particular pressure required for effecting such pressure fixing varying with the particular toner employed. The pressure is preferably provided by pressing the transfer material having the toner image thereon between a pair of polished metal rollers that are in contact with each other under a specified pressure. In general, the roll loading is from about 10 to about 600 pounds per linear inch, and preferably from about 50 to about 400 pounds per linear inch. The roll loading in pounds per linear inch is the total applied force divided by the length of the roll. In some cases, the pressure fixing of the toner to the support medium may be heat assisted; e.g., by the use of a coated or uncoated heated metal roll and an uncoated or elastomeric coated backup roll.

It is to be understood, however, that although the toners of the present invention are particularly suitable for the preparation of a final copy by pressure fixing, such toners may also be fixed by conventional procedures; e.g., heat fusing.

This invention is further illustrated by the following examples but it is to be understood that the scope of the invention is not to be limited thereby. Unless otherwise specified, all parts are by weight.

EXAMPLE I

The block copolymer poly ($\epsilon$-caprolactone) - polystyrene - poly ($\epsilon$-caprolactone) is prepared by coupling dicarboxy terminated polystyrene with poly (ε-caprolactone) having one terminal —OH group. The block is comprised of 60% polystyrene and 40%, all by weight, of the polycaprolactone. The number average molecular weight of the block copolymer is 27,000.

A toner is prepared from 75:25 mixture of polystyrene having a molecular weight of 200,000 (DOW 678) and poly (ε-caprolactone) having a molecular weight of 2,000 and varying amounts of the above described copolymer by spray drying the mixture with MOGUL L carbon black using methyl isobutyl ketone as the solvent. The resulting toner has 5 wt.% of the carbon black and an average particle size of about 15 microns.

A toner (A) prepared without any block copolymer is comprised of a single core of polycaprolactone encapsulated in the polystyrene and Toners (B & C) prepared with 10 wt.% and 20 wt.%, respectively, based on the three components, of the block copolymer are comprised of a plurality of discrete domains of polycaprolactone, having an average domain size of 0.5 and 0.1 micron, respectively, (determined by transmission electron microscopy).

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inches/sec.

The final image which is prepared from toner A is smeared upon rubbing with moderate pressure.

The final image which is prepared from toners B & C do not smear upon the rubbing with moderate pressure. The toner B has better fix properties than toner C, but toner C has a greater resistance to impactation and block than toner B.

EXAMPLE II 5g of a styrene - butadiene block copolymer (KRATON 4113), 10g of polystyrene (PS-2) and 5g of a tackifying agent (PICCOTEX LTP-135) are dissolved in methyl ethyl ketone and hexane is added while stirring, to provide 160cc of methyl ethyl ketone and 240cc of hexane. 1g of MOGUL L carbon black is dispersed by ultrasonics in about 25cc of methyl ethyl ketone and the carbon black dispersion stirred into the polymer solution. The resulting mixture is spray dried to produce a toner having an average particle size in the order of 15 microns.

The toner is combined with glass beads 250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

An acceptable fixed image is obtained.

EXAMPLE III

A 1:1 block copolymer having a weight average molecular weight of 13,000 for each block of polyvinyl acetate and polystyrene is prepared by coupling carboxy terminated vinyl acetate to polystyrene terminated with an acid chloride.

2.5 grams of poly (vinyl acetate) (M.W.: 7000), 7.5g of polystyrene (DOW 678) and 1 gram of the polystyrene - poly (vinyl acetate) block copolymer are dissolved in toluene and combined with 0.5g of MOGUL L carbon black. The mixture is spray dried to produce toner having an average particle size in the order of 15 microns.

The toner is combined with glass beads (250 microns) to produce a developer having 1wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers (the upper roller is at a temperature of 120°F.), with the loading being 400 pounds per linear inch and the roller speed 4.2 inch/sec.

EXAMPLE IV

A block copolymer of polyethylene oxide - polystyrene - polyethylene oxide in which the number average molecular weight of polystyrene is 10,500 and the number average molecular weight of each polyethylene oxide block is 8400 is prepared by a two stage process as disclosed in the article by O'Malley et al., "Synthesis and Thermal Transition Property of Styrene - Ethylene Oxide Copolymers", appearing in *Polymer Preprints* Vol. 10, No. 2, Pages 796–819 (September, 1969).

A 60:40 mixture of polyethylene oxide (CARBOWAX 1540) and polystyrene (DOW 678) is prepared and 10%, by weight, based on the three components, of the above block copolymer is added thereto.

A toner is prepared containing 5wt.% MOGUL L carbon black by spray drying using a 1:1 mixture of chloroform and ethyl benzene as solvent. The toner has an average particle size of about 15 microns and the polyethylene oxide is dispersed as a plurality of discrete domains having an average size of 0.6 – 0.7 micron.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts fixed using 3 inch bare steel rollers at room temperature with the loading being 400 pounds per linear inch and the roller speed 4.2 inch/sec.

An acceptable fixed image is obtained.

EXAMPLE V

A block copolymer of poly (dimethyl siloxane) - polystyrene - poly (dimethylsiloxane) is prepared by the procedure described by Morton et al, Journal of Applied Polymer Science, Vo. 8, 2707–2716 (1964). The block copolymer has a weight average molecular weight of 50,000.

A 75:25 mixture of polystyrene (DOW 678) and poly (dimethylsiloxane (M.W.:100,000) is prepared and 10%, by weight, based on the three components, of the above block copolymer is added thereto.

A toner is prepared containing 5 wt.% MOGUL L carbon black by spray drying using a 50:30 mixture of hexane and ethyl acetate as solvent. The toner has an average particle size of about 15 microns.

The toner is combined wth glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE VI

Isopropylidenediphenoxypropanol is reacted with adipic acid to provide a polyester having a weight average molecular weight of 2100.

The above polyester is coupled to acid chloride terminated polystyrene to produce a 1:1 block copolymer having a weight average molecular weight of 6000.

A 1:1 mixture of polystyrene (DOW 678) and the above polyester is prepared and 10%, by weight, based on the three components, of the above block copolymer is added thereto.

A toner is prepared containing 5 wt.% MOGUL L carbon black by spray drying using a 1:1 mixture of chloroform and heptane as solvent. The toner has an average particle size of about 15 microns.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE VII

A 1:1 block copolymer having a weight average molecular weight of 50,000 of bis-phenol A polycarbonate and poly (dimethyl siloxane) is prepared by the method described by Kambour, *Block Polymers*, p. 263, edited by S. L. Aggerwal, Plenum Press (1970).

A 1:1 mixture of polycarbonate (LEXAN 101) and poly (dimethyl siloxane) gum having a weight average molecular weight of 200,000 is prepared and 10%, by weight, based on the three components, of the above block copolymer is added thereto.

A toner is prepared containing 5 wt.% MOGUL L carbon black by spray drying using a 1:1 mixture of tetrahydrofuran and chloroform as solvent. The toner has an average particle size of about 15 microns.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE VIII

A 1:1 block copolymer having a weight average molecular weight of 20,000 is prepared by coupling carboxy terminated poly (hexamethylene sebecate) to polystyrene terminated with an acid chloride.

A 1:1 mixture of polystyrene (DOW 678) and poly (hexamethylene sebacate) having a weight average molecular weight of 7000 is prepared and 10% by weight, based on the three components, of the above block copolymer is added thereto.

A toner is prepared containing 5 wt.% MOGUL L carbon black by spray drying using a 1:1 mixture of chloroform and heptane as solvent. The toner has an average particle size of about 15 microns.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE IX

A 75:25 mixture of polystyrene (DOW 678) and uncrosslinked polybutadiene (weight average molecular weight 200,000) is prepared and 10%, by weight, based on the three components, of a 1:1 linear graft copolymer comprised of uncrosslinked polybutadiene (weight average molecular weight: 200,000) and polystyrene (weight average molecular weight: 10,000) is added thereto.

A toner is prepared containing 5 wt.% MOGUL L carbon black by spray drying using a 1:1 mixture of chloroform and heptane as solvent. The toner has an average particle size of about 15 microns.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE X

A 1:1 mixture of polyethylene oxide (CARBOWAX 1540) and polystyrene (DOW 678) is prepared and 10%, by weight, based on the three components, of the block copolymer of Example IV is added thereto.

A toner is prepared containing 5 wt.% MOGUL L carbon black by spray drying using a 1:1 mixture of chloroform and ethyl benzene as solvent. The toner has an average particle size of about 15 microns and the polyethylene oxide is dispersed as a plurality of discrete domains having an average size of 0.5 micron.

The toner is combined with glass beads (250 micron) to produce a developer having 1 wt.% of the toner.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

EXAMPLE XI

The block copolymer poly (ε-caprolactone) - random styrene -n-butyl methacrylate copolymer - poly (ε-caprolactone) is prepared by coupling the dicarboxy terminated random copolymer with poly (ε-caprolactone) having one terminal —OH group. The block copolymer has a number average molecular weight of 30,000 and is comprised of about equal parts, by weight, of the polycaprolactone and the random copolymer.

A toner is prepared from a 75:25 mixture of a random copolymer of styrene and n-butyl methacrylate having a weight average molecular weight of 20,000, and poly (ε-caprolactone) having a weight average molecular weight of 2,000 by spray drying the mixture with MOGUL L carbon black using methyl isobutyl ketone as the solvent. The resulting toner has 5 wt.% of the carbon black and an average particle size of about 15 microns.

The developer is used to develop an electrostatic latent image by cascading the developer (three times) over an electrostatic latent image formed on a flat selenium plate charged to +700 volts. The image is transferred to paper using +700 volts and fixed using 3 inch bare steel rollers at room temperature with the loading being 400 pounds per linear inch and the roller speed 4.2 inch/sec.

The fixed image is acceptable.

The toners of the present invention are particularly advantageous in that such toners are capable of being fixed to a support in image configuration by the application of pressure, and in addition, possess the structural properties required to withstand the forces encountered in the development process. The ability to fix a toner image by the application of pressure is advantageous in that pressure fixing, with and without heat assistance, is capable of producing fixed images in shorter periods of time.

The encapsulated toners of the present invention are an improvement over encapsulated toners in which there is a single core in that the use of a plurality of discrete domains of soft polymer prevents gross failure and separation of the soft polymer phase from the matrix. In addition, the toner is more uniform thereby providing improved blocking properties.

Numerous modifications and variations of the present invention are possible in light of the above teachings and, accordingly, within the scope of the appended claims of the invention may be practiced other than as particularly described.

What is claimed is:

1. An electrostatographic toner comprising dry particulate toner particles comprising a colorant selected from the group consisting of pigments and dyes, an electrophotographic resin, said resin comprising at least one soft deformable polymer encapsulated in a matrix of at least one tough polymer, said soft polymer being encapsulated in the tough polymer matrix in a plurality of discrete domains, said soft polymer being selected from the group consisting of alkyl acrylate polymers in which the alkyl group has from 1-12 carbon atoms, alkylmethacrylate polymers in which the alkyl group has from 4-12 carbon atoms, siloxane polymers, lactone polymers, vinyl acetate polymers, alkylene oxide polymers, and unsaturated diene polymers, and said tough polymer being selected from the group consisting of styrene polymers including polystyrene, poly halo styrene, poly alkyl styrenes, styrene-n-butyl-methacrylate copolymers; polymers of alkyl-methacrylates wherein the alkyl group has from 1-3 carbon atoms; polymers of acrylonitrile; polymers of vinyl halides, including vinyl chloride polymers; polyamides, polyesters, polymers of acrylic acids; polymers of methacrylic acids, polymers of vinyl-N-alkyl pyridene; and poly carbonates.

2. The toner composition as defined in claim 1 wherein the average domain size of the soft polymer component dispersed in the matrix is less than 15 microns.

3. The toner composition as defined in claim 1 wherein said matrix is present in a range of 10-90% by weight of the weight of both components.

4. The toner as defined in claim 1 further comprising a dry electrostatographic particulate carrier material.

5. The toner as defined in claim 1 wherein said tough polymer is a crystalline polymer having a melting temperature of greater than 40°C and said soft polymer is a crystalline polymer.

6. An electrostatographic toner comprising dry particulate toner particles comprising a colorant selected from the group consisting of dyes and pigments, and a finely-divided resin, said resin comprising at least one soft deformable polymer encapsulated in a matrix of at least one tough polymer, said soft polymer being encapsulated in the tough polymer matrix in a plurality of discrete domains, said tough polymer having a glass transition temperature (Tg) greater than 50°C, a molecular weight number average greater than 1,500, a tensile strength of at least 3,000 psi, an Izod impact strength of greater than 0.25, and a modulus of elasticity greater than 200,000 psi and said soft polymer having a glass transition temperature (Tg) less than 30°C, a number average molecular weight of from 500-50,000, and a yield stress of from 20-20,000 psi.

7. The toner as defined in claim 5 wherein said tough polymer has a glass transition temperature of from 60°-90°C, a molecular weight number average of from 10,000-100,000, a tensile strength not exceeding 10,000, an Izod impact strength of from 0.25-1.5 and a modulus elasticity not exceeding 600,000 psi, and wherein said soft polymer has a glass transition temperature (Tg) of from −5°-0°C, a number average molecular weight of from 1,000-20,000 and a yield stress of from 50-3,000 psi.

8. The toner as defined in claim 7 wherein the average domain size of a soft polymer component dispersed in the matrix is less than 15 microns.

9. The toner as defined in claim 7 wherein the percentage of said matrix is 10-90% by weight of the mixture of the two components.

10. The toner as defined in claim 7 wherein said tough polymer is selected from the group consisting of crystalline and amorphous polymers, said crystalline polymers having a melting temperature of greater than 40°C and said soft polymer is selected from the group consisting of amorphous polymers and crystalline polymers.

11. The toner composition as defined in claim 7 further comprising an electrostatographic dry particulate carrier material.

* * * * *